United States Patent
Sato

(10) Patent No.: US 9,153,821 B2
(45) Date of Patent: Oct. 6, 2015

(54) BATTERY CURRENT COLLECTOR FOIL, METHOD OF MANUFACTURING BATTERY CURRENT COLLECTOR FOIL, AND BATTERY

(75) Inventor: Takayasu Sato, Takahama (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 564 days.

(21) Appl. No.: 13/061,170

(22) PCT Filed: Jun. 30, 2009

(86) PCT No.: PCT/IB2009/006109
§ 371 (c)(1),
(2), (4) Date: Feb. 28, 2011

(87) PCT Pub. No.: WO2010/023515
PCT Pub. Date: Mar. 4, 2010

(65) Prior Publication Data
US 2011/0151331 A1    Jun. 23, 2011

(30) Foreign Application Priority Data

Sep. 1, 2008    (JP) ................................. 2008-223164

(51) Int. Cl.
| H01M 4/1315 | (2010.01) |
|---|---|
| H01M 4/131 | (2010.01) |
| H01M 4/13 | (2010.01) |
| H01M 4/02 | (2006.01) |
| H01M 4/66 | (2006.01) |
| H01M 4/04 | (2006.01) |

(52) U.S. Cl.
CPC ............ *H01M 4/661* (2013.01); *H01M 4/0421* (2013.01); *H01M 4/663* (2013.01); *H01M 4/667* (2013.01); *Y10T 29/49115* (2015.01)

(58) Field of Classification Search
None
See application file for complete search history.

(56) References Cited

U.S. PATENT DOCUMENTS

| 2002/0102348 A1 | 8/2002 | Yagi et al. |  |
|---|---|---|---|
| 2008/0020281 A1* | 1/2008 | Kogetsu et al. | 429/231.5 |
| 2008/0187834 A1* | 8/2008 | Takezawa et al. | 429/209 |
| 2009/0202908 A1* | 8/2009 | Sumihara et al. | 429/218.1 |

FOREIGN PATENT DOCUMENTS

| JP | 6-140045 | 5/1994 |
|---|---|---|
| JP | 6-349481 | 12/1994 |
| JP | 8-321310 | 12/1996 |
| JP | 11-250900 | 9/1999 |
| JP | 2000-228186 | 8/2000 |
| JP | 2000-228187 | 8/2000 |

(Continued)

OTHER PUBLICATIONS

International Search Report in International Application No. PCT/IB2009/006109; Mailing Date: Sep. 30, 2009.

(Continued)

*Primary Examiner* — Yoshitoshi Takeuchi
(74) *Attorney, Agent, or Firm* — Finnegan, Henderson, Farabow, Garrett & Dunner, LLP

(57) ABSTRACT

A method of manufacturing a battery current collector foil includes: applying wet etching (electrolytic etching) to a surface of a metal foil (aluminum foil) (step S1); and forming a conductive coating (carbon coating) on the surface of the metal foil (aluminum foil 33), which has been subjected to the wet etching, by vapor depostion (AIP) (step S2).

5 Claims, 11 Drawing Sheets

(56) References Cited

FOREIGN PATENT DOCUMENTS

| JP | 2002-170554 | | 6/2002 | | |
| JP | 2003-249223 | * | 9/2003 | ............. | H01M 4/62 |
| JP | 2006-269242 | | 10/2006 | | |
| JP | 2007-254777 | | 10/2007 | | |
| JP | WO 2008/026595 | * | 3/2008 | ............. | H01M 4/70 |
| JP | 2008-512838 | | 4/2008 | | |
| KR | 10-2006-0023899 | | 3/2006 | | |
| KR | WO 2006/028316 | * | 3/2006 | ............. | H01M 4/04 |
| WO | WO 2006/028316 | | 3/2006 | | |
| WO | WO 2006/028316 A1 | | 3/2006 | | |

OTHER PUBLICATIONS

Written Opinion of the International Searching Authority in International Application No. PCT/IB2009/006109; Mailing Date: Sep. 30, 2009.

Notification of Reason(s) for Refusal in Japanese Patent Application No. 2008-223164; Drafting Date: Jan. 28, 2011.

* cited by examiner

FIRST COMPARATIVE EXAMPLE

SECOND COMPARATIVE EXAMPLE

BATTERY CURRENT COLLECTOR FOIL, METHOD OF MANUFACTURING BATTERY CURRENT COLLECTOR FOIL, AND BATTERY

CROSS-REFERENCE TO RELATED APPLICATIONS

This application is a national phase application of International Application No. PCT/IB2009/006109, filed Jun. 30, 2009, and claims the priority of Japanese Application No. 2008-223164, filed Sep. 1, 2008, the contents of both of which are incorporated herein by reference.

BACKGROUND OF THE INVENTION

1. Field of the Invention

The invention relates to a battery current collector foil, a method of manufacturing the battery current collector foil, and a battery that uses the battery current collector foil.

2. Description of the Related Art

In recent years, with the widespread of portable electronic devices, such as cellular phones, notebook personal computers and video camcorders, and vehicles, such as hybrid electric vehicles, the need for batteries used in driving power supplies of these portable electronic devices and vehicles has been increasing. Some of the above batteries use a positive electrode current collector foil having an aluminum foil as a base material. The above batteries, for example, include lithium ion batteries that use a positive plate, which is formed by coating a positive electrode current collector foil having an aluminum foil as a base material with a positive electrode active material layer containing an Li chemical compound.

Incidentally, a coating made of aluminum oxide is formed on the surface of the aluminum foil. Thus, when a positive electrode current collector foil, in which an aluminum oxide coating is formed on the surface of the aluminum foil, is used and then a positive electrode active material layer is formed on the surface of the positive electrode current collector foil, conductivity between the aluminum foil and the positive electrode active material layer problematically decreases because of the influence of the aluminum oxide coating. To solve the above problem, there has been suggested a technique for forming a conductive coating made of carbon, or the like, by vapor deposition after the surface of the current, collector (aluminum foil) is subjected to dry etching (see, for example, Japanese Patent Application Publication No. 11-250900 (JP-A-11-250900)).

However, when the conductive coating made of carbon, or the like, is formed on the surface of the aluminum foil by vapor deposition, compression stress occurs in the vapor-deposited conductive coating. This compression stress acts on the aluminum foil. For this reason, a wrinkle may occur in the aluminum foil (positive electrode current collector foil). In addition, because of the influence of the wrinkle, it may be difficult to appropriately (uniformly) coat the surface of the positive electrode current collector foil with the positive electrode active material layer.

SUMMARY OF THE INVENTION

The invention provides a battery current collector foil that has a conductive coating formed on a surface of a metal foil and that has no wrinkle, a method of manufacturing the battery current collector foil, and a battery that uses the battery current collector foil.

A first aspect of the invention relates to a method of manufacturing a battery current collector foil. The method includes: applying wet etching to a surface of a metal foil; and forming a conductive coating having conductivity on the surface of the metal foil, which has been subjected to the wet etching, by vapor deposition.

In the manufacturing method according to the first aspect of the invention, wet etching is applied to a surface (both surfaces or one surface) of a metal foil. Thus, it is possible to remove a metal oxide coating (aluminum oxide coating when the metal foil is an aluminum foil) formed on the surface of the metal foil. Furthermore, by applying wet etching to the surface of the metal foil, it is possible to form recesses that are recessed in a thickness direction of the metal foil and that are distributed over the entire surface of the metal foil. In other words, the entire surface of the metal foil may be made uneven.

Furthermore, in the manufacturing method according to the first aspect of the invention, a conductive coating having conductivity is formed on the surface (both surfaces or one surface) of the metal foil, which has been subjected to the wet etching, by vapor deposition. The conductive coating (for example, carbon coating) having conductivity is formed on the surface of the metal foil from which the metal oxide coating has been removed. Thus, it is possible to improve conductivity between the metal foil and an active material layer (with which the surface of the battery current collector foil will be coated later). By so doing, the internal resistance of the battery may be reduced.

In addition, in the wet etching process, recesses that are recessed in a thickness direction of the metal foil are distributed over the entire surface of the metal foil (the entire surface of the metal foil is made uneven). When a conductive coating is formed on the surface of the metal foil having the recesses by vapor deposition, particles (ions, atoms, or the like) derived from a conductive coating material are hard to enter the recesses. Thus, a conductive coating is hard to be formed at the recesses. Therefore, it is possible to form a conductive coating on the surface of the metal foil other than the recesses. That is, it is possible to form a conductive coating that is split (gapped) at the positions of the recesses. Thus, compression stress of the conductive coating is dispersed (eased), so it is possible to manufacture the battery current collector foil with no wrinkle. Therefore, after that, an active material layer may be appropriately (uniformly) formed over the entire surface of the battery current collector foil.

Note that the wet etching may include electrolytic etching and chemical etching. In addition, the recesses formed by wet etching may have depths (size in the thickness direction of the metal foil) of 1 μm or above. In addition, the vapor deposition may include arc ion plating, sputtering, plasma CVD, and the like.

Furthermore, the metal foil may have a thickness of 50 μm or below.

By using the metal foil having a thickness of 50 μm or below, it is possible to reduce the size of an electrode plate or electrode element that uses the metal foil and, by extension, it is possible to reduce the size of a battery. Incidentally, when the thickness of the metal foil is reduced to 50 μm or below, a wrinkle easily occurs in the metal foil because of compression stress of the vapor-deposited conductive coating. However, in the manufacturing method according to the first aspect of the invention, as described above, recesses are formed and distributed over the entire surface of the metal foil by wet etching, and then a conductive coating is formed on the surface of the metal foil by vapor deposition. Thus, it is possible to disperse (ease) compression stress of the conductive coating. Therefore, even with the metal foil having a thickness of 50 μm or below, it is possible to manufacture a battery current collector foil with no wrinkle.

Furthermore, when the conductive coating is formed on the surface of the metal foil by vapor deposition, the conductive coating having a thickness of 50 nm or above may be formed by arc ion plating (AIP).

A conductive coating formed by AIP exhibits higher conductivity than a conductive coating formed by another method (for example, sputtering). In addition, with the conductive coating having a thickness of 50 nm or above, it is possible to further improve conductivity. Thus, with the battery current collector foil manufactured by the above method, it is possible to reduce the internal resistance (particularly, reaction resistance) of the battery.

Furthermore, the conductive coating may be a conductive coating made of carbon (hereinafter, referred to as carbon coating).

Thus, it is possible to improve conductivity between the metal foil and the active material layer, and it is possible to prevent corrosion of the surface of the metal foil. Incidentally, high compression stress occurs in the vapor-deposited carbon coating, so a wrinkle easily occurs, particularly, in the metal foil. However, in the manufacturing method according to the first aspect of the invention, as described above, recesses are formed and distributed over the entire surface of the metal foil by wet etching, and then a conductive coating is formed on the surface of the metal foil by vapor deposition. Thus, it is possible to disperse (ease) compression stress of the conductive coating. Therefore, when a carbon coating is formed as the conductive coating as well, it is possible to prevent occurrence of a wrinkle in the battery current collector foil.

Furthermore, the metal foil may be a metal foil made of aluminum (hereinafter, referred to as aluminum foil).

An aluminum oxide coating is formed on the surface of the aluminum foil. As described above, by applying wet etching to the aluminum foil, it is possible to remove the aluminum oxide coating. Furthermore, recesses may be formed and distributed over the entire surface of the aluminum foil (the surface of the aluminum foil may be made uneven).

Furthermore, by forming a conductive coating on the surface of the etched aluminum foil by vapor deposition, it is possible to improve conductivity between the aluminum foil and the active material layer. In addition, recesses are formed and distributed over the entire surface of the aluminum foil by wet etching, and then a conductive coating is formed on the surface of the aluminum foil by vapor deposition. Thus, it is possible to disperse (ease) compression stress of the conductive coating. By so doing, it is possible to manufacture the battery current collector foil with no wrinkle.

Note that the battery current collector foil manufactured by the above manufacturing method is suitable as a positive electrode current collector foil of a lithium ion secondary battery.

A second aspect of the invention relates to a battery current collector foil. The battery current collector foil includes: a metal foil; and a conductive coating that has conductivity and that is formed on a surface of the metal foil. The conductive coating is in direct contact with a metal that forms the metal foil, and the metal foil has recesses that are recessed in a thickness direction of the metal foil and that are distributed over the entire surface of the metal foil.

The battery current collector foil according to the second aspect of the invention is a battery current collector foil that includes a metal foil and a conductive coating that has conductivity and that is formed on a surface (both surfaces or one surface) of the metal foil. The metal foil has recesses that are recessed in a thickness direction of the metal foil and that are distributed over the entire surface (both surfaces or one surface) of the metal foil. In other words, the entire surface of the metal foil is made uneven. The above battery current collector foil may be, for example, manufactured by any one of the above described manufacturing methods. Thus, the battery current collector foil according to the second aspect of the invention has no wrinkle. Therefore, an active material layer may be appropriately (uniformly) formed over the entire surface (both surfaces or one surface) of the battery current collector foil according to the second aspect of the invention.

In addition, the conductive coating is in direct contact with a metal that forms the metal foil (aluminum metal when the metal foil is an aluminum foil). That is, in a state where a metal oxide coating (aluminum oxide coating when the metal foil is an aluminum foil) formed on the surface of the metal foil has been removed, a conductive coating (for example, carbon coating) is formed on the surface (both surfaces or one surface) of the metal foil. Thus, it is possible to improve conductivity between the metal foil and the active material layer and, by extension, the internal resistance of the battery may be reduced.

Furthermore, the conductive coating may be formed on the surface of the metal foil other than the recesses.

That is, the conductive coating is split (gapped) at the positions of the recesses. Thus, compression stress of the conductive coating is dispersed (eased), so the battery current collector foil has no wrinkle.

Furthermore, each of the recesses may have a size (hereinafter, referred to as depth) of 1 μm or above in the thickness direction of the metal foil.

With the recesses having depths of 1 μm or above, it is possible to prevent a conductive coating from being formed in the recesses when the conductive coating is formed on the surface of the metal foil by vapor deposition. Thus, compression stress of the conductive coating is dispersed (eased), so no wrinkle occurs in the battery current collector foil. Thus, the battery current collector foil has no wrinkle. Note that the recesses having depths of 1 μm or above may be formed by wet etching (electrolytic etching, or the like).

Furthermore, the metal foil may have a thickness of 50 μm or below.

By using the metal foil having a thickness of 50 μm or below, it is possible to reduce the size of an electrode plate or electrode element that uses the metal foil and, by extension, it is possible to reduce the size of a battery. Incidentally, when the thickness of the metal foil is reduced to 50 μm or below, and when a conductive coating is formed on the surface of the metal foil by vapor deposition, a wrinkle easily occurs in the metal foil because of compression stress of the vapor-deposited conductive coating. However, as described above, in the battery current collector foil according to the second aspect of the invention, compression stress of the conductive coating is dispersed (eased), so the battery current collector foil has no wrinkle.

Furthermore, the conductive coating may have a thickness of 50 nm or above.

With the conductive coating having a thickness of 50 nm or above, it is possible to improve conductivity of the conductive coating. Thus, the internal resistance (particularly, reaction resistance) of the battery may be reduced. Note that the conductive coating is desirably formed on the surface of the metal foil by arc ion plating (AIP). This is because a carbon coating formed by AIP exhibits higher conductivity than a carbon coating formed by another method (for example, sputtering).

Furthermore, the conductive coating may be a conductive coating made of carbon.

The battery current collector foil has a conductive coating (hereinafter, referred to as carbon coating) made of carbon. Thus, it is possible to improve conductivity between the metal foil and the active material layer, and it is possible to prevent corrosion of the surface of the metal foil. Incidentally, high compression stress occurs in the vapor-deposited carbon coating, so a wrinkle easily occurs, particularly, in the metal foil. However, as described above, in the battery current collector foil according to the second aspect of the invention, compression stress of the conductive coating is dispersed (eased), so the battery current collector foil has no wrinkle.

Furthermore, the metal foil may be a metal foil made of aluminum.

The battery current collector foil is suitable as a positive electrode current collector foil of a lithium ion secondary battery.

A third aspect of the invention relates to a battery. The battery includes an electrode plate that includes the battery current collector foil manufactured by any one of the above described manufacturing methods and an active material layer laminated on a surface of the battery current collector foil.

The battery according to the third aspect of the invention includes an electrode plate that includes the battery current collector foil manufactured by any one of the above described manufacturing methods and an active material layer laminated on a surface (both surfaces or one surface) of the battery current collector foil. The battery current collector foil manufactured by any one of the above described manufacturing methods has no wrinkle, so it is possible to appropriately (uniformly) form the active material layer over the entire surface of the battery current collector foil. Thus, the electrode plate of the battery according to the third aspect of the invention has the active material layer that is laminated over the entire surface of the battery current collector foil in uniform thickness. In addition, with the battery current collector foil manufactured by any one of the above described manufacturing methods, conductivity between the metal foil and the active material layer improves. Thus, the battery according to the third aspect of the invention has a small internal resistance (particularly, reaction resistance).

A fourth aspect of the invention relates to a battery. The battery includes an electrode plate that includes any one of the above described battery current collector foils and an active material layer laminated on a surface of the battery current collector foil.

The battery according to the fourth aspect of the invention includes an electrode plate that includes any one of the above described battery current collector foils and an active material layer laminated on a surface of the battery current collector foil. The above described battery current collector foils have no wrinkle, so it is possible to coat the entire surface of the battery current collector foil with the active material layer in uniform thickness. Thus, the electrode plate of the battery according to the fourth aspect of the invention has the active material layer that is laminated over the entire surface of the battery current collector foil in uniform thickness. In addition, the above described battery current collector foils can improve conductivity between the metal foil and the active material layer. Thus, the battery according to the fourth aspect of the invention has a small internal resistance (particularly, reaction resistance).

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

First Embodiment

Figure 1:
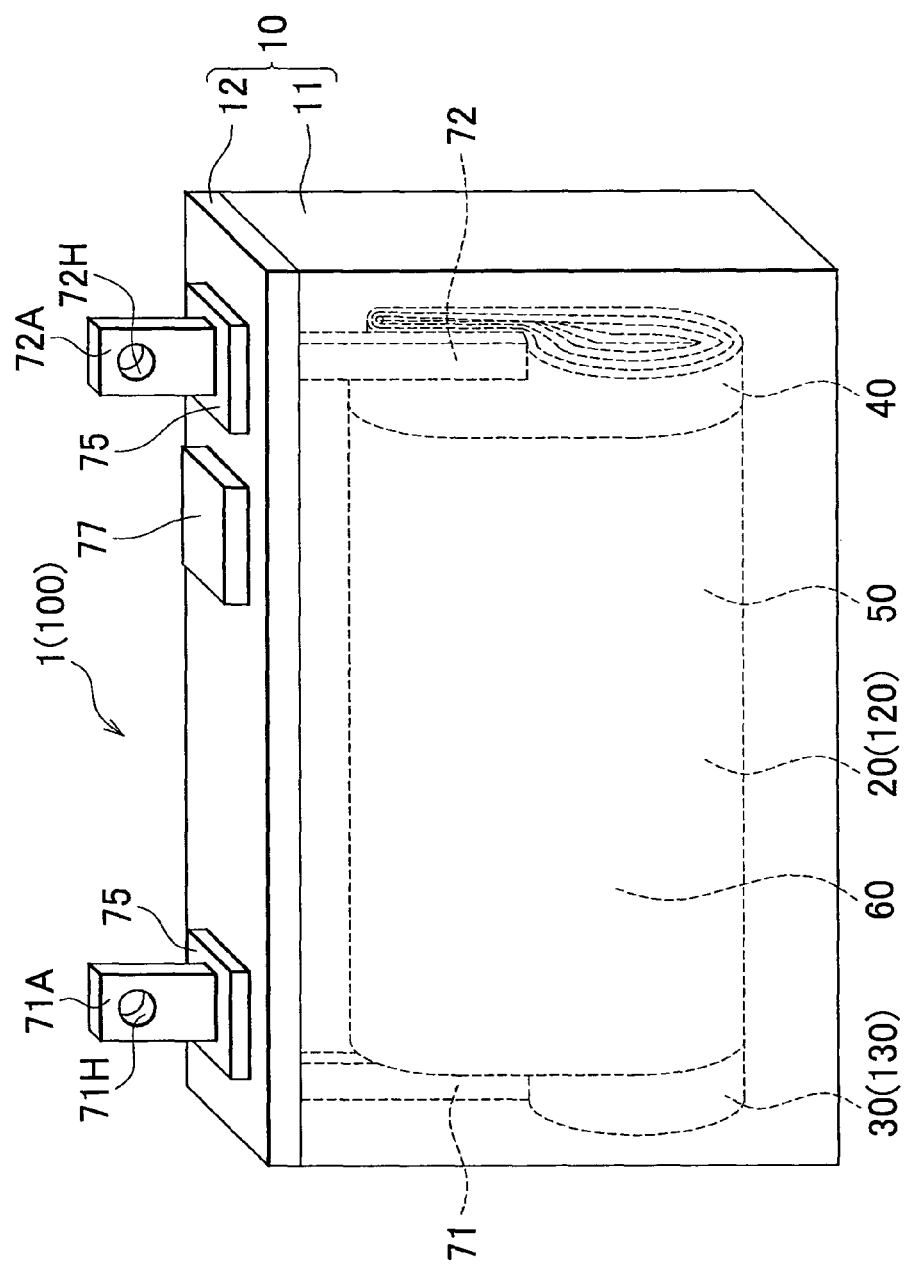
FIG. 1 is a perspective view of a battery according to first and second embodiments.
Figure 2:
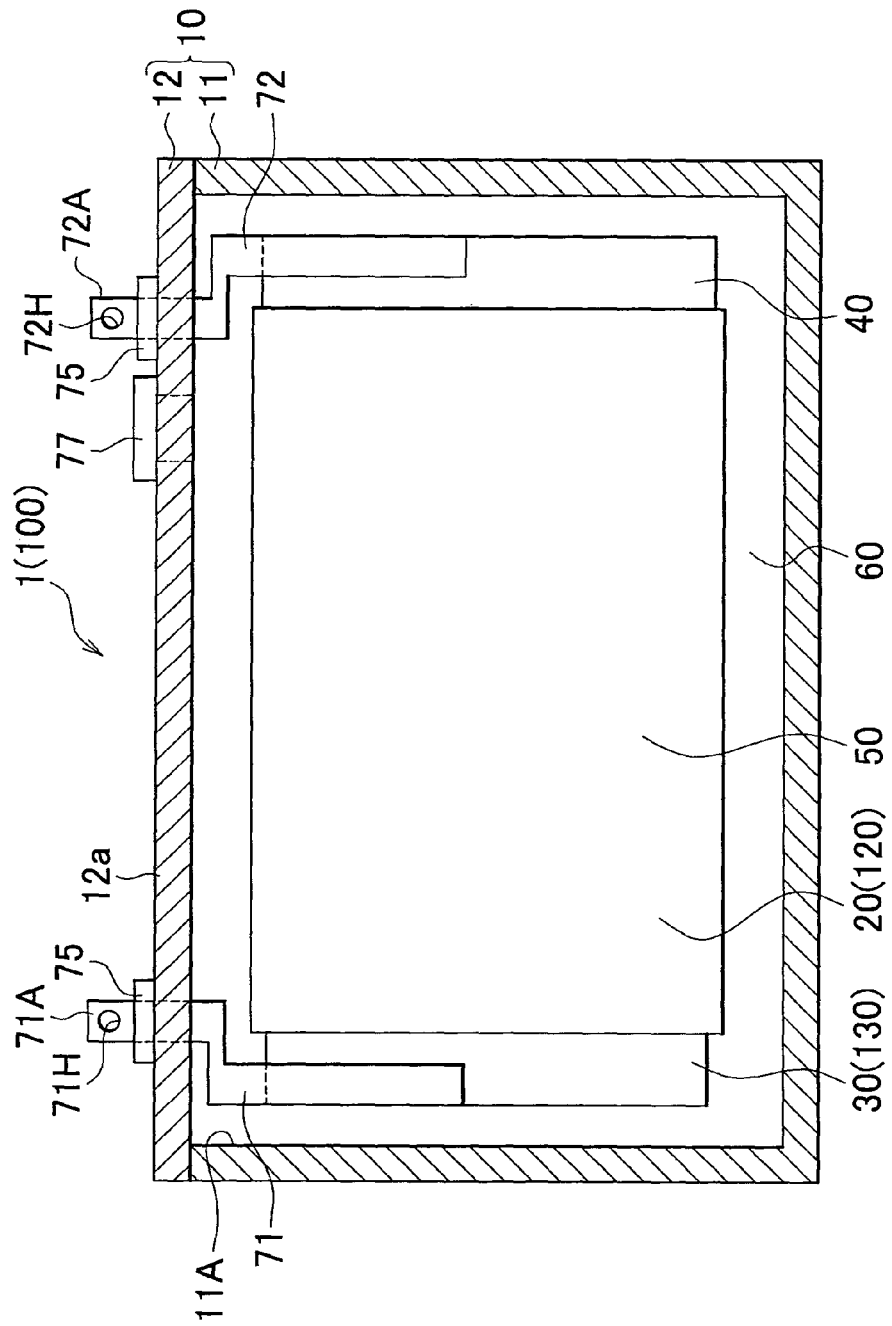
FIG. 2 is a partially cut-away cross-sectional view of the battery according to the first and second embodiments.

A first embodiment of the invention will be described with reference to the accompanying drawings. First, a battery 1 according to the first embodiment will be described. FIG. 1 shows a perspective view of the battery 1. FIG. 2 shows a partially cut-away cross-sectional view of the battery 1. The battery 1 according to the first embodiment is a lithium ion secondary battery that includes an electrode element 20 and an electrolytic solution 60. In the battery 1, the electrode element 20 and the electrolytic solution 60 are accommodated in a rectangular box-shaped battery case 10. The battery case 10 includes an aluminum battery case body 11 and a sealing lid 12. The battery case body 11 has a closed-end rectangular box shape, and an insulating film (not shown) made of resin is stuck over the entire inner surface of the battery case body 11.

In addition, the sealing lid 12 has a rectangular plate shape. The sealing lid 12 closes an opening 11A of the battery case body 11, and is welded to the battery case body 11. A positive electrode terminal member 71 and a negative electrode terminal member 72 are connected to the electrode element 20, which will be described later. The positive electrode terminal member 71 has a positive electrode terminal portion 71A at its distal end. The negative electrode terminal member 72 has a negative electrode terminal portion 72A at its distal end. The positive electrode terminal portion 71A and the negative electrode terminal portion 72A extend through the sealing lid 12 and protrude from an upper surface 12a of the sealing lid 12. A resin insulating member 75 is interposed between the positive electrode terminal portion 71A and the sealing lid 12 and between the negative electrode terminal portion 72A and the sealing lid 12 to electrically insulate the positive electrode terminal portion 71A and the negative electrode terminal portion 72A from the sealing lid 12. Furthermore, a rectangular plate-like safety relief valve 77 is sealingly attached to the sealing lid 12.

The electrolytic solution 60 is an organic electrolytic solution having a lithium ion concentration of 1 mol/L. The organic electrolytic solution is prepared in such a manner that 1 mol/L $LiPF_6$, as a solute, is added to a mixed organic solvent in which ethylene carbonate (EC), dimethyl carbonate (DMC) and ethyl methyl carbonate (EMC) are adjusted to a volume ratio of EC:DMC:EMC=1:1:1.

The electrode element 20 is formed so that a sheet-like positive plate 30 and a sheet-like negative plate 40 are rolled to be flat via a sheet-like separator 50 made of polyethylene (see FIG. 1). Note that, in the electrode element 20, the positive plate 30 is connected to the positive electrode terminal member 71, and the negative plate 40 is connected to the negative electrode terminal member 72.

Figure 3:
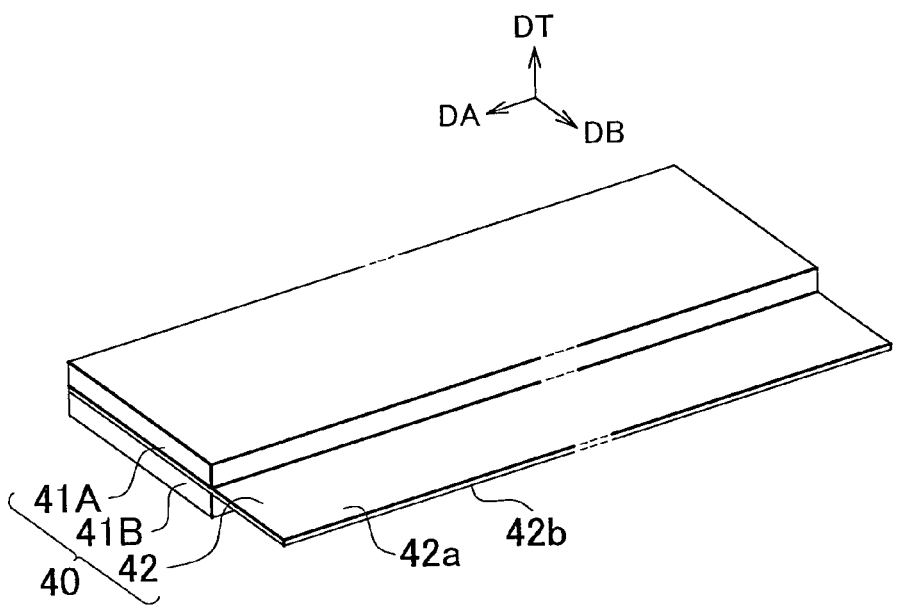
FIG. 3 is a perspective view of a negative plate according to the first and second embodiments.

As shown in FIG. 3, the negative plate 40 has a sheet-like shape and extends in a longitudinal direction DA. The negative plate 40 includes a negative electrode current collector foil 42, a first negative electrode active material layer 41A, and a second negative electrode active material layer 41B. The negative electrode current collector foil 42 is made of copper. The first negative electrode active material layer 41A is laminated on a first surface 42a of the negative electrode current collector foil 42. The second negative electrode active material layer 41B is laminated on a second surface 42b of the negative electrode current collector foil 42. Note that the negative electrode active material layers 41A and 41B each contain graphite and a binder, which are not shown.

Figure 4:
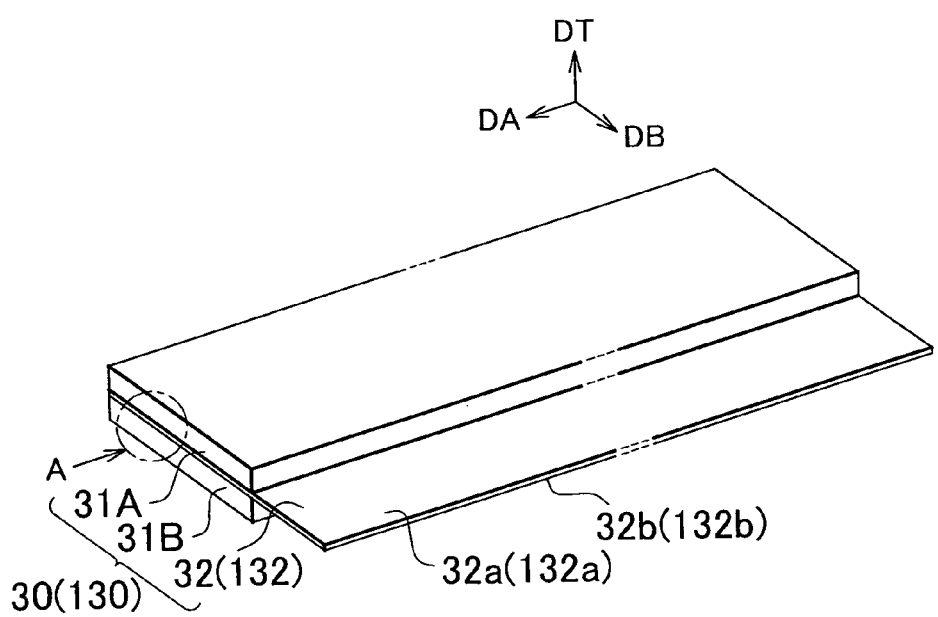
FIG. 4 is a perspective view of a positive plate according to the first and second embodiments.

Next, the positive plate 30 will be described. As shown in FIG. 4, the positive plate 30 has a sheet-like positive electrode current collector foil 32 that extends in the longitudinal direction DA. The positive plate 30 includes a first positive electrode active material layer 31A and a second positive electrode active material layer 31B that are laminated on surfaces (a first surface 32a and a second surface 32b) of the positive electrode current collector foil 32.

The first positive electrode active material layer 31A and the second positive electrode active material layer 31B each contain a positive electrode active material (not shown) made of $LiNiO_2$, acetylene black (AB, not shown), polytetrafluoroethylene (PTFE, not shown) and carboxymethyl cellulose (CMC, not shown). Note that, in each of the first positive electrode active material layer 31A and the second positive electrode active material layer 31B, a mixture ratio of the positive electrode active material, AB, PTFE and CMC is positive electrode active material:AB:PTFE:CMC=87:10:1:2 (ratio by weight).

Figure 5:
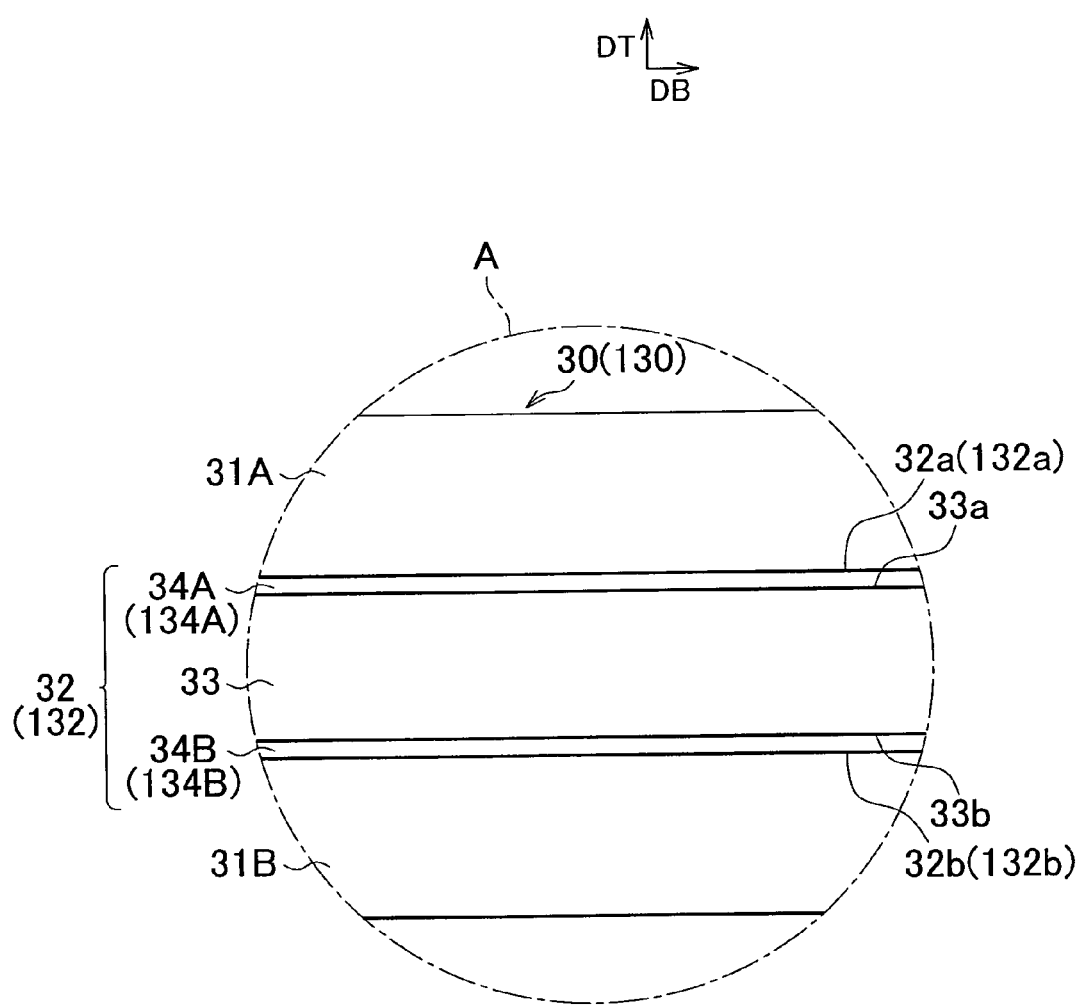
FIG. 5 is an enlarged end view (enlarged view of A portion in FIG. 4) of the positive plate according to the first and second embodiments.

In addition, the positive electrode current collector foil 32 is made of metal aluminum. The positive electrode current collector foil 32 includes a sheet-like aluminum foil 33, a first carbon coating 34A and a second carbon coating 34B (see FIG. 5). The sheet-like aluminum foil 33 extends in the longitudinal direction DA. The first carbon coating 34A is formed on a first surface 33a of the aluminum foil 33. The second carbon coating 34B is formed on a second surface 33b of the aluminum foil 33. That is, the carbon coatings are formed respectively on both surfaces of the aluminum foil 33.

The first carbon coating 34A is formed by evaporating carbon onto the first surface 33a of the aluminum foil 33 through arc ion plating (AIP), and the second carbon coating 34B is formed by evaporating carbon onto the second surface 33b of the aluminum foil 33 through arc ion plating (AIP). The first carbon coating 34A and the second carbon coating 34B each have a thickness (thickness in the thickness direction DT in FIG. 5) of 50 to 100 nm.

Incidentally, when carbon coatings are formed on the surfaces of the aluminum foil by vapor deposition, such as ALP, large compression stress occurs in the vapor-deposited carbon coatings. Therefore, the compression stress acts on the aluminum foil. This may possibly cause a wrinkle to occur in the aluminum foil (positive electrode current collector foil).

Figure 6:
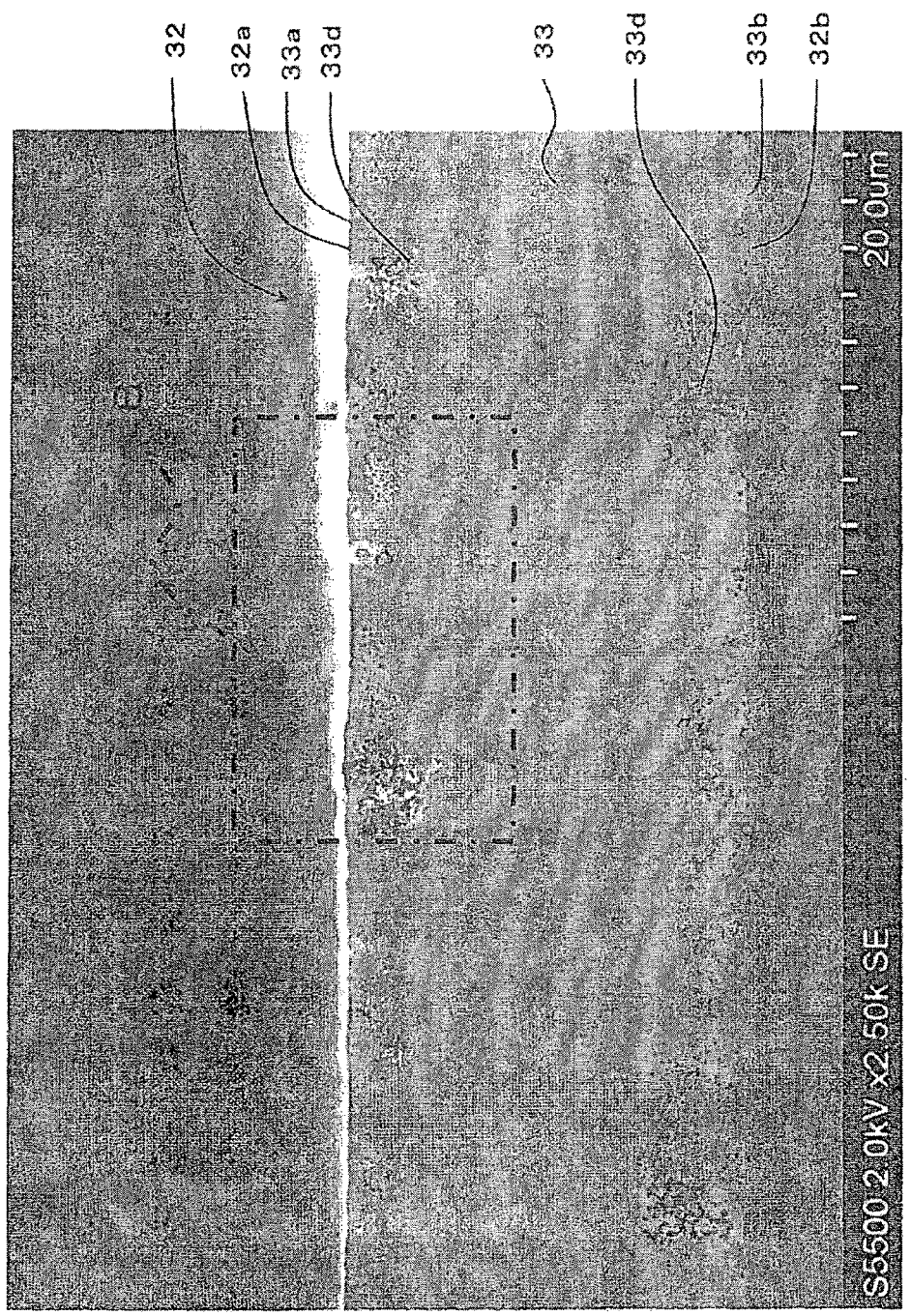
FIG. 6 is a 2500-fold-enlarged SEM photograph of a cross section, taken in the thickness direction, of a positive electrode current collector foil according to the first embodiment.
Figure 7:
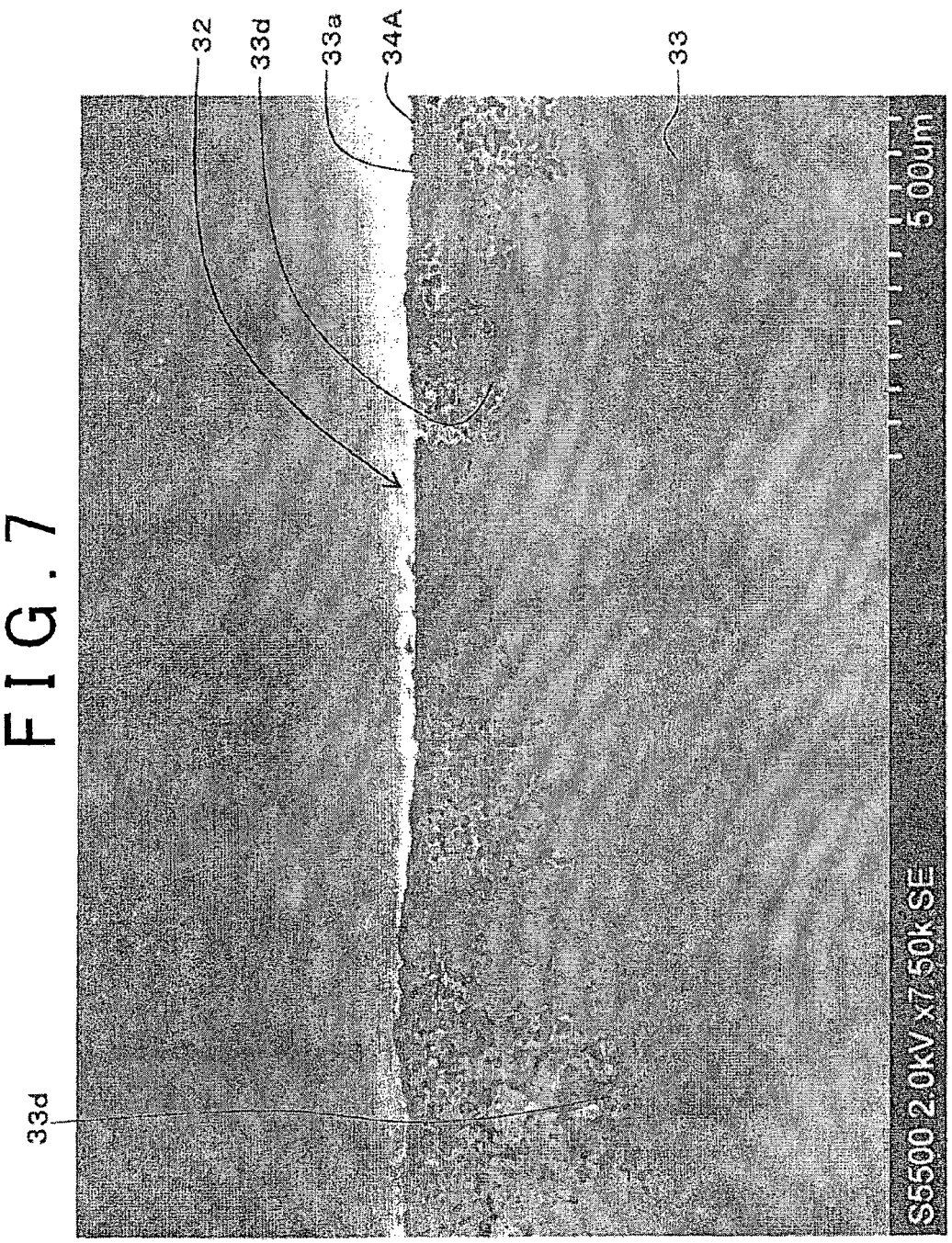
FIG. 7 is a 7500-fold-enlarged SEM photograph (enlarged view of B portion in FIG. 6) of the cross section of the positive electrode current collector foil according to the first embodiment.

In contrast, the aluminum foil 33 according to the first embodiment has a large number of recesses 33d distributed over the entire first surface 33a and the entire second surface 33b as shown in FIG. 6 and FIG. 7. The recesses 33d are recessed in the thickness direction of the aluminum foil 33 (vertical direction in FIG. 6 and FIG. 7). In other words, the entire first surface 33a and the entire second surface 33b are uneven.

Figure 12:
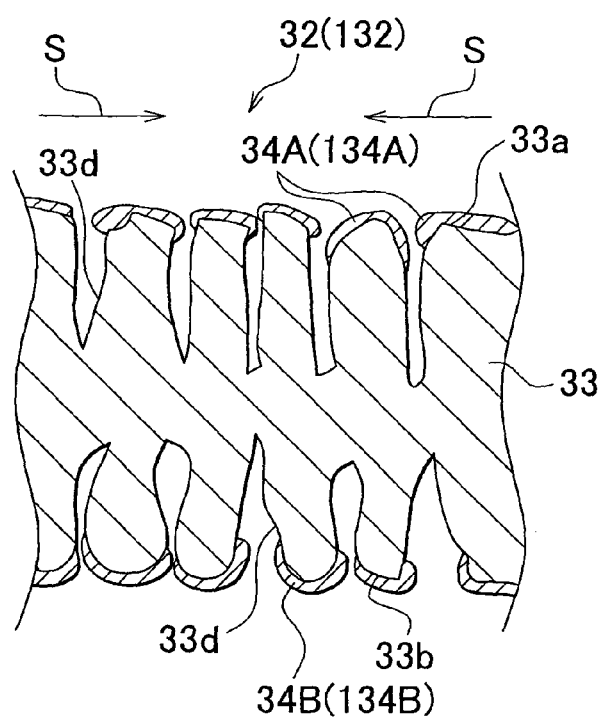
FIG. 12 is a view that illustrates a state where a carbon coating is formed on the surfaces of the positive electrode current collector foil that has been subjected to electrolytic etching.

Thus, as shown in FIG. 12, as carbon coatings are formed by AIP, the carbon coatings (the first carbon coating 34A and the second carbon coating 34B) are formed on the surfaces (the first surface 33a and the second surface 33b) of the aluminum foil 33 other than the recesses 33d. That is, it is possible to form the conductive coatings (the first carbon coating 34A and the second carbon coating 34B) that are split (gapped) at the positions of the recesses 33d. This is because particles (ions derived from a conductive coating material) that form the conductive coatings are hard to enter the recesses 33d in AIP. Thus, compression stress S of the conductive coatings (the first carbon coating 34A and the second carbon coating 34B) is dispersed (eased), so the positive electrode current collector foil 32 according to the first embodiment has no wrinkle.

FIG. 6 is a 2500-fold-enlarged SEM photograph of a cross section, taken in the thickness direction (vertical direction in FIG. 6), of the positive electrode current collector foil 32. The graduations at the lower right side in FIG. 6 are 20 μm in ten graduations (in 2 μm increments). In addition, FIG. 7 is a 7500-fold-enlarged SEM photograph of the cross section of the positive electrode current collector foil 32, and corresponds to an enlarged view of B portion in FIG. 6. The graduations at the lower right side in FIG. 7 are 5 μm in 10 graduations (in 0.5 μm increments).

In the first embodiment, the aluminum foil 33 has a thickness of about 18 μm, and the recesses 33d have depths (size in the thickness direction of the aluminum foil 33, and size in the vertical direction in FIG. 6 and FIG. 7) of 3 to 7 μm. Note that the recesses 33d are formed by applying wet etching (specifically, electrolytic etching), which will be described later, to the surfaces of the aluminum foil.

Furthermore, in the positive electrode current collector foil 32 according to the first embodiment, the first carbon coating 34A and the second carbon coating 34B are in direct contact with the metal aluminum that forms the aluminum foil 33 (see FIG. 7). That is, in a state where metal oxide (aluminum oxide) coatings formed on the surfaces of the aluminum foil 33 have been removed, carbon coatings (the first carbon coating 34A and the second carbon coating 34B) are formed on the surfaces (the first surface 33a and the second surface 33b) of the aluminum foil 33. Thus, it is possible to improve conductivity between the aluminum foil 33 and the positive electrode active material layers (the first positive electrode active material layer 31A and the second positive electrode active material layer 31B) and, by extension, the internal resistance of the battery 1 may be reduced.

Note that metal oxide (aluminum oxide) coatings formed on the surfaces of the aluminum foil 33 are removed by applying wet etching (specifically, electrolytic etching), which will be described later, to the surfaces of the aluminum foil.

Figure 8:
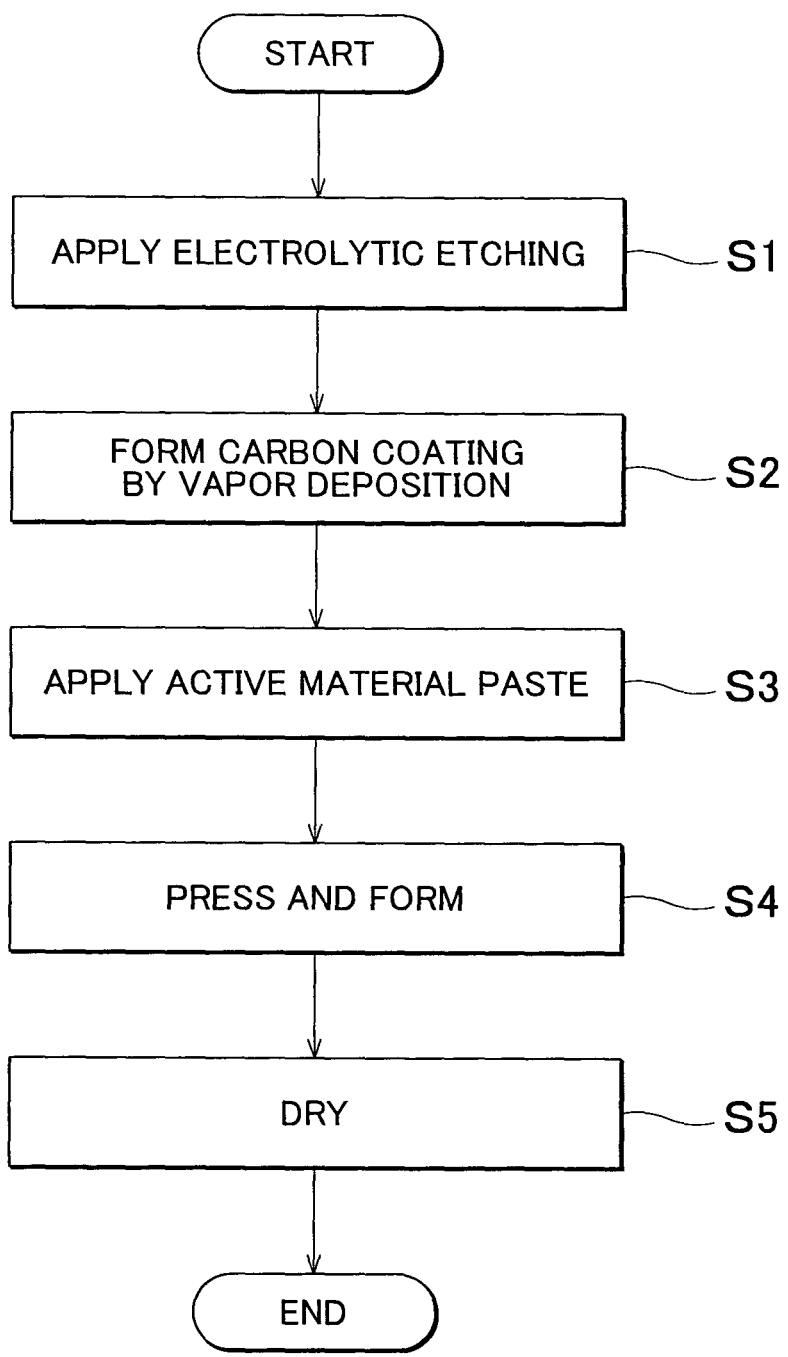
FIG. 8 is a flowchart that shows a method of manufacturing the positive plate according to the first and second embodiments.
Figure 11:
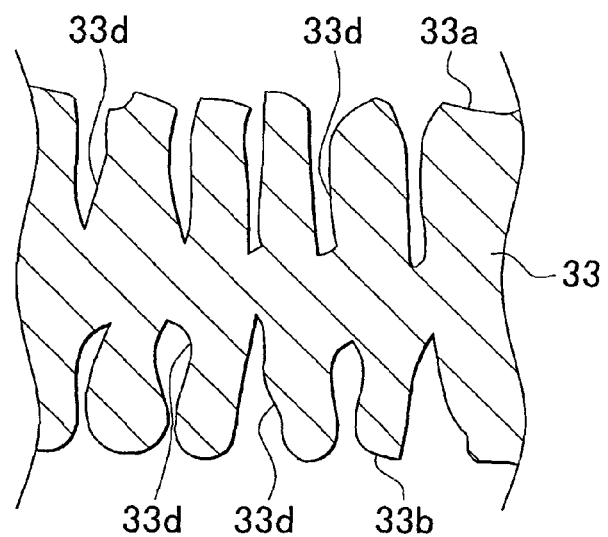
FIG. 11 is a schematic cross-sectional view, taken in the thickness direction, of a positive electrode current collector foil that has been subjected to electrolytic etching.

Next, a method of manufacturing the battery 1 according to the first embodiment will be described with reference to the accompanying drawings. First, a method of manufacturing the positive plate 30 will be described. FIG. 8 is a flowchart that shows the method of manufacturing the positive plate. First, an aluminum foil is prepared, and, in step S1, the surfaces (both surfaces) of the aluminum foil are subjected to wet etching (specifically, electrolytic etching). By so doing, metal oxide (aluminum oxide) coatings formed on the surfaces (the first surface 33a and the second surface 33b, that is, both surfaces) of the aluminum foil may be removed. Moreover, as shown in FIG. 11, a large number of the recesses 33d that are recessed in the thickness direction (vertical direction in FIG. 11) of the aluminum foil 33 may be formed so as to be distributed over the entire surfaces (the first surface 33a and the second surface 33b) of the aluminum foil 33. In other words, the entire surfaces (the first surface 33a and the second surface 33b) of the aluminum foil 33 may be made uneven.

Note that in step S1 (see FIG. 8) of the first embodiment, electrolytic etching is performed using the aluminum foil as an anode. In addition, a mineral acid (sulfuric acid, nitric acid, hydrochloric acid, or the like) is used as an electrolytic solution. In addition, in the first embodiment, the step S1 may be regarded as a wet etching process.

Subsequently, in step S2, conductive coatings (specifically, carbon coatings) having conductivity are formed on the surfaces (the first surface 33a and the second surface 33b, that is, both surfaces) of the aluminum foil 33, which has been subjected to electrolytic etching, by vapor deposition (specifically, arc ion plating). More specifically, carbon is used as a vapor deposition material, and the first carbon coating 34A having a thickness of 50 to 100 nm is formed on the first surface 33a of the aluminum foil 33 by arc ion plating (AIP). In addition, the second carbon coating 34B having a thickness of 50 to 100 nm is formed on the second surface 33b by AIP. By so doing, the positive electrode current collector foil 32 (see FIG. 6) may be obtained.

Note that the carbon coatings formed by AIP exhibit higher conductivity than carbon coatings formed by another method (for example, sputtering). Thus, with the positive electrode current collector foil 32 according to the first embodiment, it is possible to reduce the internal resistance (particularly, reaction resistance) of the battery.

Furthermore, in the first embodiment, the carbon coatings (the first carbon coating 34A and the second carbon coating 34B) are formed on the surfaces (the first surface 33a and the second surface 33b, that is, both surfaces) of the aluminum foil 33 from which aluminum oxide coatings have been removed. Thus, it is possible to improve conductivity between the aluminum foil 33 and the first positive electrode active material layer 31A and second positive electrode active material layer 31B (with which the surfaces of the positive electrode current collector foil 32 will be coated later) and, by extension, the internal resistance of the battery may be reduced.

Moreover, in the wet etching process (step S1), a large number of the recesses 33d are formed so as to be distributed over the entire surfaces (the first surface 33a and the second surface 33b) of the aluminum foil 33. In other words, the entire surfaces (the first surface 33a and the second surface 33b) of the aluminum foil 33 are made uneven.

Thus, as shown in FIG. 12, as carbon coatings are formed by vapor deposition (specifically, arc ion plating), the carbon coatings (the first carbon coating 34A and the second carbon coating 34B) are formed on the surfaces (the first surface 33a and the second surface 33b) of the aluminum foil 33 other than the recesses 33d. That is, it is possible to form the conductive coatings (the first carbon coating 34A and the second carbon coating 34B) that are split (gapped) at the positions of the recesses 33d. This is because particles (ions or atoms derived from a conductive coating material) that form the conductive coatings are hard to enter the recesses 33d in vapor deposition.

Thus, compression stress S of the conductive coatings (the first carbon coating 34A and the second carbon coating 34B) is dispersed (eased), so it is possible to manufacture the positive electrode current collector foil 32 with no wrinkle. Therefore, after that, the positive electrode active material layers (the first positive electrode active material layer 31A and the second positive electrode active material layer 31B) may be appropriately (uniformly) formed over the entire surfaces of the positive electrode current collector foil 32. Note that, in the first embodiment, the step S2 may be regarded as a vapor deposition process.

Then, in step S3, positive electrode active material paste is applied onto the surfaces (the first surface 32a and the second surface 32b) of the positive electrode current collector foil 32. Note that the active material paste is a liquid that is a mixture of a positive electrode active material (not shown) made of LiNiO$_2$, acetylene black (AB, not shown), polytetrafluoroethylene (PTFE, not shown) and carboxymethyl cellulose (CMC, not shown) dispersed in an organic solvent (N-methyl-2-pyrrolidone). The ratio by weight of the positive electrode active material, AB, PTFE and CMC contained in the active material paste is positive electrode active material:AB:PTFE:CMC=87:10:1:2.

Note that, in the first embodiment, the positive electrode active material paste may be appropriately applied over the entire surfaces (the first surface 32a and the second surface 32b) of the positive electrode current collector foil 32 in uniform thickness. This is because the positive electrode current collector foil 32 having no wrinkle may be manufactured through the processes (wet etching process and vapor deposition process) in steps S1 and S2.

Subsequently, in step S4, the positive electrode active material paste that has been applied onto the surfaces (the first surface 32a and the second surface 32b) of the positive electrode current collector foil 32 is compressed by a pressing machine to form the positive electrode active material paste into a predetermined shape together with the positive electrode current collector foil 32. Then, in step S5, the positive electrode active material paste is dried to obtain the positive plate 30 (see FIG. 4) that includes the positive electrode active material layers (the first positive electrode active material layer 31A and the second positive electrode active material layer 31B).

After that, the prepared positive plate 30 is rolled together with the separately prepared negative plate 40 via the separator 50 to form the electrode element 20. Furthermore, the positive electrode terminal member 71 and the negative electrode terminal member 72 are welded to the electrode element 20 and inserted into the battery case body 11. The electrolytic solution 60 is poured into the battery case body 11, and then the sealing lid 12 is welded to the battery case body 11 to seal the opening of the battery case body 11. In this manner, the battery 1 is completed (see FIG. 1).

Figure 9:
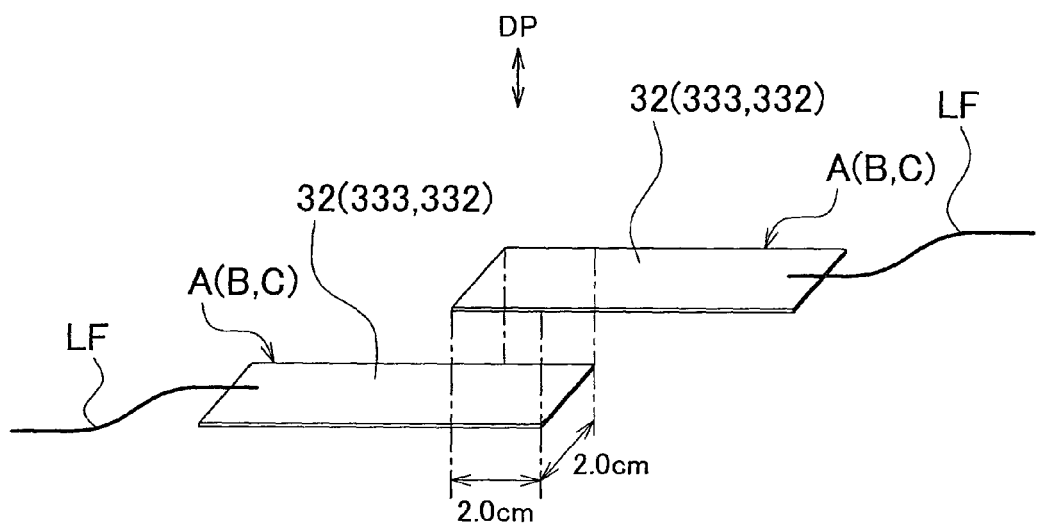
FIG. 9 is a view that illustrates a method of measuring a contact resistance of the positive electrode current collector foil.
Figure 10:
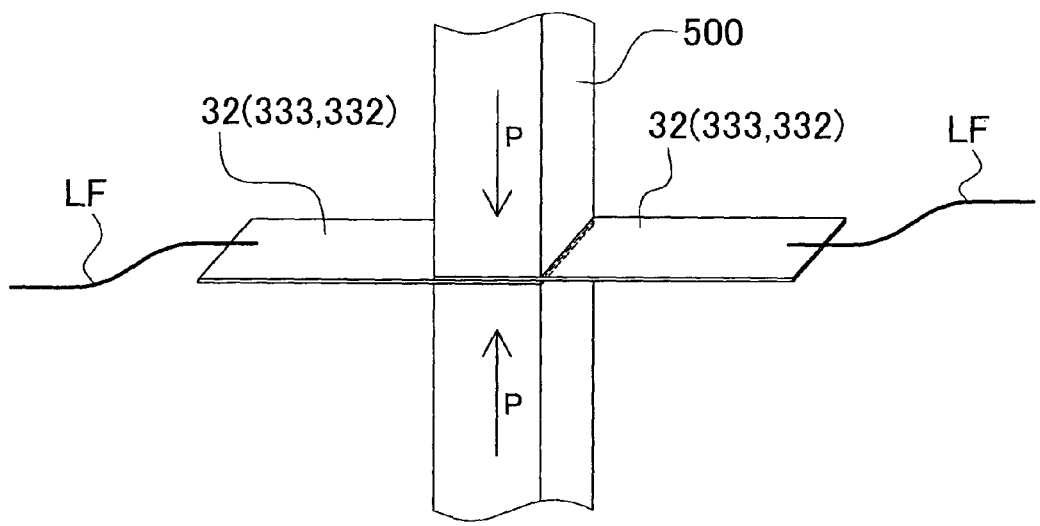
FIG. 10 is a view that illustrates a method of measuring a contact resistance of the positive electrode current collector foil.

In order to evaluate conductivity of the thus formed positive electrode current collector foil 32, the contact resistance of the positive electrode current collector foil 32 was measured. Specifically, as shown in FIG. 9, the positive electrode current collector foil 32 was cut into a ribbon shape having a width of 2.0 cm. Then, a conductor wire LF was connected to the ribbon-shaped positive electrode current collector foil 32 to form a sample A (first embodiment), and two samples A were prepared. Thereafter, the two samples A were partially overlapped at a contact surface having an area of 2.0 cm by 2.0 cm so as to be in contact with each other. Subsequently, as shown in FIG. 10, the contact surfaces of the samples A were pressed against each other in the overlapped direction DP by a clamping machine 500 having two flat surfaces that are usable for clamping the contact surfaces of the samples A. Note that the clamping machine 500 clamped the contact surfaces at a clamping pressure P of 10 MPa/cm$^2$. Then, while being clamped by the clamping machine 500, each of the conductor wires LF of the samples A was supplied with 1.0 A current. Thereafter, a resistance value (contact resistance value) between the samples A was calculated from a voltage value at that time.

In addition, an aluminum foil 333 (see FIG. 13) of which aluminum oxide coatings formed on the surfaces have been removed by dry etching was prepared as a first comparative example. The aluminum foil 333 was cut into a ribbon shape having a width of 2.0 cm, and a conductor wire LF was connected to the ribbon-shaped aluminum foil 333 to form a sample B. Then, the contact resistance of the sample B was measured in the same manner as the above sample A. Furthermore, a positive electrode current collector foil 332 (FIG. 14) in which carbon coatings (a first carbon coating 334A and a second carbon coating 334B) having a thickness of about 50 nm are formed on the surfaces (a first surface 333a and a second surface 333b) of the aluminum foil 333 by sputtering was prepared as a second comparative example. The positive electrode current collector foil 332 was cut into a ribbon shape having a width of 2.0 cm, and a conductor wire LF was connected to the ribbon-shaped positive electrode current collector foil 332 to form a sample C. Then, the contact resistance of the sample C was also measured in the same manner as the above sample A. The measurement results are shown in Table 1.

TABLE 1

| | Etching | Carbon Coating | Wrinkles of Current Collector | Contact Resistance ($\Omega \cdot cm^2$) | Internal Resistance ($\Omega$) | |
| --- | --- | --- | --- | --- | --- | --- |
| | | | | | Direct-current Resistance | Reaction Resistance |
| First Embodiment | Wet | AIP | Nothing | 3.5 | $2.67 \times 10^{-2}$ | $6.61 \times 10^{-3}$ |
| First Comparative Example | Dry | Nothing | Nothing | 18.5 | $2.76 \times 10^{-2}$ | $7.64 \times 10^{-3}$ |
| Second Comparative Example | Dry | Sputtering | Small Number of Wrinkles | 21.9 | $2.78 \times 10^{-2}$ | $8.37 \times 10^{-3}$ |
| Third Comparative Example | Dry | AIP | Large Number of Wrinkles | — | Unmeasurable | |

As shown in Table 1, the relationship among the respective contact resistance values of the sample A (first embodiment), the sample B (first comparative example) and the sample C (second comparative example) is A<B<C. Specifically, the contact resistance value of the sample A (first embodiment) is 3.5 $\Omega \cdot cm^2$, the contact resistance value of the sample B (first comparative example) is 18.5 $\Omega \cdot cm^2$, and the contact resistance value of the sample C (second comparative example) is 21.9 $\Omega \cdot cm^2$.

Thus, the contact resistance of the positive electrode current collector foil 32 according to the first embodiment is smaller than that of the aluminum foil 333 in which aluminum oxide coatings formed on the surfaces have been removed by dry etching. Furthermore, the contact resistance of the positive electrode current collector foil 32 is smaller than that of the positive electrode current collector foil 332 in which carbon coatings (the first carbon coating 334A and the second carbon coating 334B) having a thickness of about 50 nm are formed on the surfaces (the first surface 333a and the second surface 333b) of the aluminum foil 333 by sputtering.

This is presumably because, in the first embodiment, the carbon coatings (the first carbon coating 34A and the second carbon coating 34B) are formed by arc ion plating (AIP) on the surfaces (the first surface 33a and the second surface 33b) of the aluminum foil 33 of which the aluminum oxide coatings have been removed.

Specifically, this is presumably because the carbon coatings formed by AIP exhibit higher conductivity than carbon coatings formed by another method (for example, sputtering), so the contact resistance of the first embodiment (sample A) is smaller than the contact resistance of the second comparative example (sample C).

Figure 13:
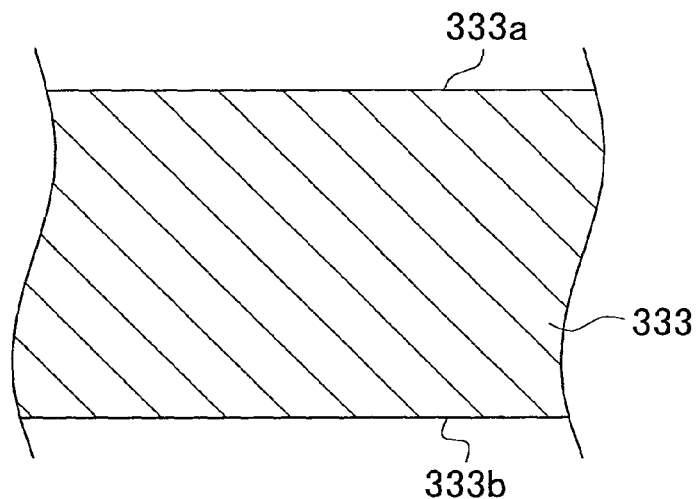
FIG. 13 is a schematic cross-sectional view, taken in the thickness direction, of a positive electrode current collector foil that has been subjected to dry etching.
Figure 14:
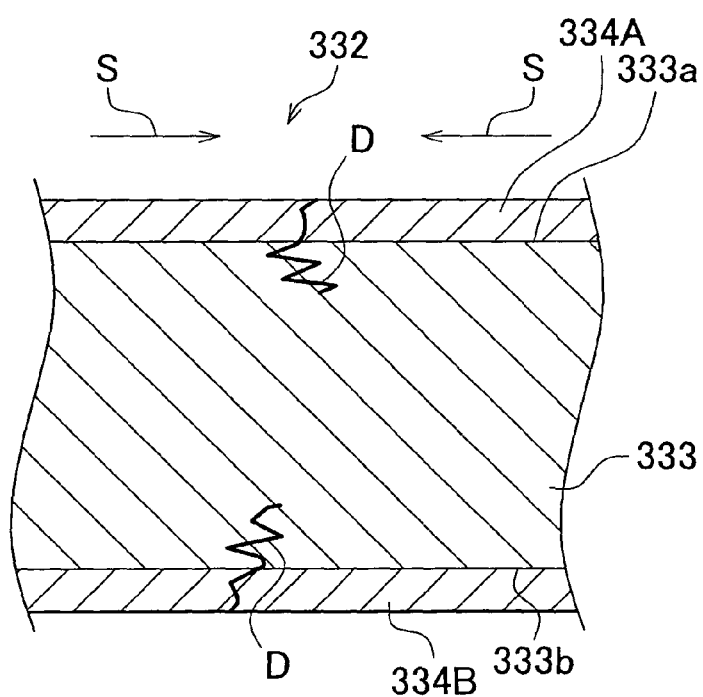
FIG. 14 is a view that illustrates a state where a carbon coating is formed on the surface of the positive electrode current collector foil that has been subjected to dry etching.

In addition, in the second comparative example, as shown in FIG. 14, small wrinkles D occurred in the aluminum foil 333 (positive electrode current collector foil 332) because of the compression stress S of the carbon coatings (the first carbon coating 334A and the second carbon coating 334B). This is because no recess was formed on the surfaces (the first surface 333a and the second surface 333b) of the aluminum foil 333 by dry etching (see FIG. 13). In other words, this is because the surfaces (the first surface 333a and the second surface 333b) of the aluminum foil 333 were not made uneven by dry etching.

Thus, as shown in FIG. 14, it is presumable that the carbon coatings (the first carbon coating 334A and the second carbon coating 334B) were formed on the surfaces (the first surface 333a and the second surface 333b) of the aluminum foil 333 without any gaps to increase the compression stress S of the carbon coatings as compared with the first embodiment. It is presumable that, for this reason, the wrinkles D occurred in the second comparative example. In contrast, the positive electrode current collector foil 32 according to the first embodiment has no wrinkle unlike the above second comparative example. The wrinkles D are presumably caused by an increase in the contact resistance of the second comparative example (sample C).

In addition, in the first comparative example (sample B), the aluminum oxide coatings formed on the surfaces of the aluminum foil are removed by dry etching. However, no carbon coating is formed on the surfaces of the aluminum foil, so it is presumable that the surfaces of the aluminum foil is oxidized to form aluminum oxide coatings again. In contrast, in the first embodiment, the carbon coatings (the rust carbon coating 34A and the second carbon coating 34B) are formed on the surfaces (the first surface 33a and the second surface 33b) of the aluminum foil 33 from which the aluminum oxide coatings have been removed, so it is possible to prevent oxidization of the aluminum foil 33. It is presumable that, for the above reason, the contact resistance of the first embodiment (sample A) is smaller than the contact resistance of the first comparative example (sample B).

According to the above results, the positive electrode current collector foil 32 according to the first embodiment has a small contact resistance and high conductivity. Thus, the positive electrode active material contained in the first positive electrode active material layer 31A and the second positive electrode active material layer 31B, which are respectively laminated on the first surface 32a and second surface 32b of the positive electrode current collector foil 32, is allowed to exchange electrons with the aluminum foil 33 at a low resistance. That is, according to the first embodiment, it is possible to reduce the resistance of the positive plate 30, and the battery 1 having a small internal resistance may be implemented.

Evaluation of Internal Resistance

Next, the impedance was measured in order to evaluate the internal resistance of the battery 1 according to the first embodiment. Specifically, for the battery 1 having a battery voltage of 3.8 V, the measuring frequency was varied within the range of 0.01

Hz to 100 kHz while a potential amplitude of 0.01 V was applied under a constant temperature of 25° C., and then the impedance was measured from a synchronized current value. A direct-current resistance ($\Omega$) and a reaction resistance ($\Omega$) were calculated from the measured impedance. The results are shown in Table 1. Note that in the first embodiment, the impedance was measured using an electrochemical measuring system (frequency analyzer+potentio/galvano stat) (Solartron, 1255WB).

In addition, a battery manufactured in the same manner as that of the first embodiment except that the aluminum foil 333 (see FIG. 13) was used as the positive electrode current collector foil was prepared as a first comparative example. Furthermore, a battery manufactured in the same manner as that of the first embodiment except that the positive electrode current collector foil 332 (FIG. 14) was used as the positive electrode current collector foil was prepared as a second comparative example. The impedance of each of the first and second comparative examples was measured, and a direct-current resistance ($\Omega$) and a reaction resistance ($\Omega$) were calculated as in the case of the battery 1 according to the first embodiment. These results are shown in Table 1.

Note that a positive electrode current collector foil in which carbon coatings having a thickness of about 50 nm are formed on the surfaces (the first surface 333a and the second surface 333b) of the aluminum foil 333 by AIP was prepared as a third comparative example. The positive electrode current collector foil was used to try to prepare a positive plate; however, the positive electrode current collector foil has too many wrinkles, so it was difficult to form a positive electrode active material layer on the positive electrode current collector foil. Therefore, a battery according to the third comparative example could not be manufactured.

First, the direct-current resistances of the batteries according to the first and second comparative examples and the direct-current resistance of the battery 1 according to the first embodiment are compared with one another. As shown in Table 1, the battery according to the first comparative example has a direct-current resistance of $2.76 \times 10^{-2} \Omega$. In contrast, the battery 1 according to the first embodiment has a direct-current resistance of $2.67 \times 10^{-2} \Omega$, which is smaller by 3% than that of the battery according to the first comparative example. On the other hand, the battery according to the second comparative example has a direct-current resistance of $2.78 \times 10^{-2} \Omega$, which is larger by 0.9% than that of the battery according to the first comparative example.

Furthermore, the reaction resistances of the batteries according to the first and second comparative examples and the reaction resistance of the battery 1 according to the first embodiment are compared with one another. As shown in Table 1, the battery according to the first comparative example has a reaction resistance of $7.64 \times 10^{-3} \Omega$. In contrast, the battery 1 according to the first embodiment has a reaction resistance of $6.61 \times 10^{-3} \Omega$, which is smaller by 13.4% than that of the battery according to the first comparative example. On the other hand, the battery according to the second comparative example has a reaction resistance of $8.37 \times 10^{-3} \Omega$, which is larger by 9.6% than that of the battery according to the first comparative example.

As described above, the battery 1 according to the first embodiment has an internal resistance (particularly, reaction resistance) smaller than that of the battery according to the first comparative example. In the positive electrode current collector foil used in the battery according to the first comparative example, the aluminum oxide coatings on the surfaces of the aluminum foil have been removed by dry etching. However, no carbon coating is formed on the surfaces of the aluminum foil, so it is presumable that the surfaces of the aluminum foil are oxidized to form aluminum oxide coatings again. Thus, it is presumable that the internal resistance (particularly, reaction resistance) of the first comparative example is increased because of a decrease in conductivity between the aluminum foil and the positive electrode active material layers due to the influence of the aluminum oxide coatings.

In contrast, in the positive electrode current collector foil 32 used in the battery 1 according to the first embodiment, it is presumable that oxidization of the aluminum foil 33 may be prevented because the carbon coatings (the first carbon coating 34A and the second carbon coating 34B) are formed on the surfaces (the first surface 33a and the second surface 33b) of the aluminum foil 33 from which the aluminum oxide coatings have been removed. In addition, the conductive carbon coatings are formed on the surfaces of the aluminum foil 33 from which the aluminum oxide coatings have been removed. Thus, it is possible to improve conductivity between the aluminum foil 33 and the first positive electrode active material layer 31A and between the aluminum foil 33 and the second positive electrode active material layer 31B. It is presumable that, because of the above reason, the internal resistance of the battery is reduced.

Furthermore, the battery 1 according to the first embodiment uses the positive electrode current collector foil 32 in which the carbon coatings (the first carbon coating 34A and the second carbon coating 34B) are formed by arc ion plating (AIP) on the surfaces (the first surface 33a and the second surface 33b) of the aluminum foil 33 from which the aluminum oxide coatings have been removed. The carbon coatings formed by AIP exhibit higher conductivity than carbon coatings formed by another method (for example, sputtering). It is presumable that, because of the above reason, the internal resistance of the battery 1 according to the first embodiment may be reduced.

Incidentally, although the battery according to the second comparative example uses the positive electrode current collector foil 332 in which the carbon coatings (the first carbon coating 334A and the second carbon coating 334B) are formed on the surfaces (the first surface 333a and the second surface 333b) of the aluminum foil 333 from which the aluminum oxide coatings have been removed, the internal resistance (particularly, reaction resistance) of the battery is larger than that of the battery according to the first embodiment.

This is presumably because, different from the first embodiment, the aluminum oxide coatings have been removed by dry etching, so no recess is formed on the surfaces (the first surface 333a and the second surface 333b) of the aluminum foil 333 (see FIG. 13). In other words, this is presumably because the surfaces (the first surface 333a and the second surface 333b) of the aluminum foil 333 are not made uneven.

Thus, as shown in FIG. 14, it is presumable that the carbon coatings (the first carbon coating 334A and the second carbon coating 334B) are formed on the surfaces (the first surface 333a and the second surface 333b) of the aluminum foil 333 without any gaps to increase the compression stress S of the carbon coatings as compared with the first embodiment. For this reason, it is presumable that the aluminum foil 333 (the positive electrode current collector foil 332) has the wrinkles D and, because of the influence of the wrinkles D, it may be difficult to appropriately form the positive electrode active material layer over the entire surfaces of the positive electrode current collector foil 332 in uniform thickness.

In addition, the battery according to the second comparative example uses the positive electrode current collector foil 332 in which the carbon coatings (the first carbon coating 334A and the second carbon coating 334B) are formed by sputtering. A carbon coating formed by sputtering exhibits lower conductivity than that of a carbon coating formed by AIP. Thus, the carbon coatings formed by sputtering may also be regarded as one of the reasons why the internal resistance of the second comparative example are not reduced.

Second Embodiment

Next, a battery 100 according to a second embodiment will be described. As indicated by the reference numerals in parentheses in FIG. 1 and FIG. 2, the battery 100 according to the second embodiment differs from the battery 1 according to the first embodiment in that the electrode element (more specifically, the positive plate), and the other components of the battery 100 are similar to those of the battery 1. Specifically, as indicated by the reference numerals in parentheses in FIG. 4, the battery 100 according to the second embodiment uses a positive plate 130 instead of the positive plate 30 according to the first embodiment. The positive plate 130 differs from the positive plate 30 according to the first embodiment in that the positive plate 130 uses a positive electrode current collector foil 132.

The positive electrode current collector foil 132 according to the second embodiment is prepared by a method different from that of the positive electrode current collector foil 32 according to the first embodiment. Specifically, as shown in FIG. 8, in step S1, as in the case of the first embodiment, the surfaces (both surfaces) of the aluminum foil are subjected to wet etching (specifically, electrolytic etching). After that, in step S2, carbon coatings are formed on the surfaces (the first surface 33a and the second surface 33b) of the aluminum foil 33, which has been subjected to electrolytic etching, by vapor deposition different from that of the first embodiment. Specifically, arc ion plating is used as vapor deposition in the first embodiment, while sputtering is used as vapor deposition in the second embodiment.

More specifically, in the second embodiment, a first carbon coating 134A having a thickness of about 50 nm is formed on the first surface 33a of the aluminum foil 33 by known sputtering. In addition, a second carbon coating 134B having a thickness of about 50 nm is formed on the second surface 33b by known sputtering.

Incidentally, in the second embodiment as well as the first embodiment, in the wet etching process (step S1), a large number of the recesses 33d are formed so as to be distributed over the entire surfaces (the first surface 33a and the second surface 33b) of the aluminum foil 33. In other words, the entire surfaces (the first surface 33a and the second surface 33b) of the aluminum foil 33 may be made uneven.

Thus, as shown in FIG. 12, as carbon coatings are formed by sputtering, the carbon coatings (the first carbon coating 134A and the second carbon coating 134B) are formed on the surfaces (the first surface 33a and the second surface 33b) of the aluminum foil 33 other than the recesses 33d. That is, it is possible to form the conductive coatings (the first carbon coating 134A and the second carbon coating 134B) that are split (gapped) at the positions of the recesses 33d. This is because particles (sputtered particles) that form the conductive coatings are hard to enter the recesses 33d in sputtering.

Thus, compression stress S of the conductive coatings (the first carbon coating 134A and the second carbon coating 134B) is dispersed (eased), so it is possible to manufacture the positive electrode current collector foil 132 with no wrinkle.

After that, as in the case of the first embodiment, the processes in steps S3 to S5 (see FIG. 8) are carried out to prepare the positive plate 130. As described above, the positive electrode current collector foil 132 has no wrinkle. Thus, the positive electrode active material layers (the first positive electrode active material layer 31A and the second positive electrode active material layer 31B) may be appropriately formed on the entire surfaces of the positive electrode current collector foil 132 in uniform thickness. Thereafter, the battery 100 is assembled using the positive plate 130 in a similar procedure to that of the first embodiment.

The impedance of the battery 100 according to the second embodiment was measured, and a direct-current resistance and a reaction resistance were calculated as in the case of the first embodiment. Then, both resistance values are smaller than those of the first and second comparative examples. This is presumably because the second embodiment uses the positive electrode current collector foil 132 that includes the vapor-deposited carbon coatings (the first carbon coating 134A and the second carbon coating 134B) with no wrinkle as the positive electrode current collector foil. From the above results, the battery 100 according to the second embodiment has a small internal resistance.

However, the direct-current resistance value and reaction resistance value of the battery 100 according to the second embodiment both are larger than those of the first embodiment. This is presumably because, to form carbon coatings on the surfaces of the aluminum foil 33, AIP is used in the first embodiment, whereas sputtering is used in the second embodiment. It is presumable that, because a carbon coating formed by sputtering exhibits lower conductivity than that of a carbon coating formed by AIP, the battery 100 according to the second embodiment has an internal resistance larger than that of the battery 1 according to the first embodiment.

The aspects of the invention are described using the first and second embodiments; however, the aspects of the invention are not limited to the embodiments described above. The aspects of the invention may be, of course, appropriately modified into various forms without departing from the scope of the invention.

For example, in the first and second embodiments, the battery case of the battery has a rectangular accommodating casing. Instead, for example, the battery case may be a cylindrical or a laminated accommodating casing. In addition, in the first and second embodiments, the conductive coatings of the positive electrode current collector foil are carbon coatings. Instead, the conductive coatings may be coatings made of a metal. That is, coatings made of a metal may be formed on the surfaces of the aluminum foil 33 by vapor deposition.

In addition, in the first and second embodiments, the positive electrode current collector foils 32 and 132 are illustrated as the battery current collector foil. Instead, the aspects of the invention may be applied to the negative electrode current collector foil. That is, it is also applicable that the surfaces of a negative electrode metal foil (for example copper foil) is subjected to wet etching (for example, electrolytic etching), and then conductive coatings (for example, carbon coatings) are formed respectively on the surfaces of the negative electrode metal foil by vapor deposition (for example, AIP) to prepare the negative electrode current collector foil.

Figure 15:
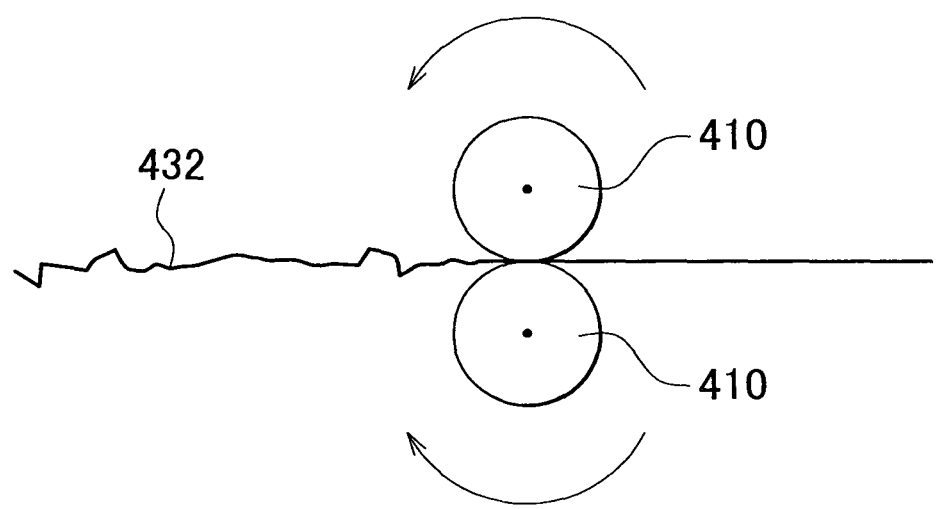
FIG. 15 is a view that illustrates a method of smoothing wrinkles for a positive electrode current collector foil in which wrinkles occur.

In addition, as shown in FIG. 15, a pair of hot press rollers 410 are used to smooth wrinkles of a positive electrode current collector foil 432 to make it possible to correct the positive electrode current collector foil 432 having wrinkles into a positive electrode current collector foil with no wrinkle. The pair of hot press rollers 410 are heated (at, for example, 300° C.) by a heater (not shown), and hold the positive electrode current collector foil therebetween to press the positive electrode current collector foil (for example, at a pressure of $30\times10^5$ N). Note that the positive electrode current collector foil 432, for example, includes the positive electrode current collector foil prepared as the third comparative example. The pair of hot press rollers 410 are used to correct the positive electrode current collector foil having wrinkles into a positive electrode current collector foil with no wrinkle. Thus, it is possible to appropriately form the positive electrode active material layers on the surfaces of the corrected positive electrode current collector foil.

The invention claimed is:

1. A battery current collector foil comprising:
a metal foil; and
a conductive coating that has conductivity and that is formed on a surface of the metal foil between the metal foil and an active material layer, wherein
the conductive coating is in direct contact with a metal that forms the metal foil,
the metal foil has recesses that are recessed in a thickness direction of the metal foil and that are distributed over the entire surface of the metal foil,
each of the recesses has a depth of 1 μm or more in the thickness direction of the metal foil,
the conductive coating is provided on the surface of the metal foil other than the recesses,
the conductive coating is not provided in the recesses,
the battery current collector foil is a current collector for a positive electrode, and
the conductive coating consists of carbon.

2. The battery current collector foil according to claim 1, wherein the metal foil has a thickness of 50 μm or less.

3. The battery current collector foil according to claim 1, wherein the conductive coating has a thickness of 50 nm or more.

4. The battery current collector foil according to claim 3, wherein the conductive coating has a thickness of 50 to 100 nm.

5. The battery current collector foil according to claim 1, wherein
the recesses have depths of 3 to 7 μm.

* * * * *